United States Patent
Zhang et al.

(10) Patent No.: US 11,960,532 B2
(45) Date of Patent: Apr. 16, 2024

(54) IMAGE MANAGEMENT METHOD, APPARATUS, AND SYSTEM, AND TERMINAL DEVICE

(71) Applicant: HUAWEI TECHNOLOGIES CO., LTD., Shenzhen (CN)

(72) Inventors: Ping Zhang, Hangzhou (CN); Wei Su, Dongguan (CN); Ling Deng, Shenzhen (CN); Ting Lei, Nanjing (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 18/169,017

(22) Filed: Feb. 14, 2023

(65) Prior Publication Data
US 2023/0195779 A1    Jun. 22, 2023

Related U.S. Application Data (63) Continuation of application No. PCT/CN2021/088806, filed on Apr. 21, 2021.

(30) Foreign Application Priority Data

Aug. 14, 2020   (CN) .......................... 202010819992.6

(51) Int. Cl.
G06F 16/583    (2019.01)
G06F 16/54     (2019.01)
G06F 16/55     (2019.01)

(52) U.S. Cl.
CPC ............ *G06F 16/583* (2019.01); *G06F 16/54* (2019.01); *G06F 16/55* (2019.01)

(58) Field of Classification Search
None
See application file for complete search history.

(56) References Cited

U.S. PATENT DOCUMENTS

| | | | |
|---|---|---|---|
| 9,977,951 B2* | 5/2018 | Jiang | G06V 20/30 |
| 10,242,250 B2* | 3/2019 | Jiang | G06V 20/30 |
| 10,755,086 B2* | 8/2020 | Jiang | G06F 16/583 |
| 10,979,761 B2* | 4/2021 | Sekar | H04N 21/23418 |
| 11,023,710 B2* | 6/2021 | Dai | G06N 5/022 |
| 2016/0350587 A1 | 12/2016 | Bataller et al. | |
| 2022/0067343 A1* | 3/2022 | Takahashi | G06T 1/00 |
| 2023/0195779 A1* | 6/2023 | Zhang | G06F 18/22 707/736 |

* cited by examiner

*Primary Examiner* — Kim T Nguyen
(74) *Attorney, Agent, or Firm* — Leydig, Voit & Mayer, Ltd.

(57) ABSTRACT

An image management method includes: after a video stream sent by a camera is obtained, recognizing a face image in the video stream through face recognition; comparing the image with a face image that is in an area in which the camera is located in a database; and if the comparison fails, expanding the area in which the camera is located around, and then comparing the face image with face images in an area obtained after the area in which the camera is located is expanded.

20 Claims, 6 Drawing Sheets

IMAGE MANAGEMENT METHOD, APPARATUS, AND SYSTEM, AND TERMINAL DEVICE

CROSS-REFERENCE TO RELATED APPLICATIONS

This application is a continuation of International Application No. PCT/CN2021/088806, filed on Apr. 21, 2021, which claims priority to Chinese Patent Application No. 202010819992.6, filed on Aug. 14, 2020. Both of the aforementioned applications are hereby incorporated by reference in their entireties.

FIELD

The present application relates to the field of image management, and in particular, to an image management method, apparatus, and system, and a terminal device.

BACKGROUND

In the security field, a face image can be converted, by using a deep neural network, into a machine-recognizable vector for representation. Then a similarity degree of two face images is calculated based on an angle between vectors of the two face images. Based on this technology, a large quantity of face comparison-based applications are generated, such as a face recognition turnstile and face recognition alert deployment. However, because of complexity of face images, face vector dimensions obtained through deep neural network conversion are usually from 128 to 512. High dimensionality of vectors causes high computing overheads for face image comparison, which makes it difficult to use the technology in a large-scale face recognition application.

In order to reduce costs of high-dimensional vector comparison, an image management technology is used in the security field that applies face comparison. A specific implementation process is as follows. Face features of a large quantity of face images are extracted, clustering based on the face features of the face images is performed, and then clustered face images are grouped according to natural persons, to obtain a face feature set of face images of each natural person. When face recognition is performed, a face feature of an obtained face image is compared with the face feature set of the face images of each natural person. A natural person to which the obtained face image belongs is determined based on a similarity degree of comparison.

In the current technology, because a large quantity of face feature sets of natural person face images are stored in a database, high computing overheads are incurred in a process of obtaining a face feature similarity degree by using this method.

SUMMARY

To resolve the foregoing problem, embodiments of this application provide an image management method, apparatus, and system, and a terminal device.

According to a first aspect, this application provides an image management method. The method includes: receiving image data sent by a first camera, where the image data includes at least one face image, and the at least one face image includes a first face image; obtaining the first face image in the image data; comparing the first face image with a face image in a first area in a database, where the database is a database storing face images in each area, and the first area is an area in which at least one camera including the first camera is located; when the face image in the first area in the database does not include a face image of a photographed person corresponding to the first face image, comparing the first face image with face images in a second area in the database, where the second area is an area obtained by expanding the first area around, the second area is an area in which a plurality of cameras including the first camera are located, and a quantity of cameras in the second area is greater than a quantity of cameras in the first area; and when the face images in the second area in the database include a face image of the photographed person corresponding to the first face image, clustering the first face image and the face image of the photographed person corresponding to the first face image.

In this implementation, after a face image of a photographed person included in image data captured by a camera is obtained, the image is compared with a face image that is in an area in which the camera is located in a database. If the comparison fails, the area in which the camera is located is expanded around, and then the face image is compared with face images in an area expanded based on the area in which the camera is located. By gradually expanding a comparison area, a large quantity of resources and a large amount of time consumed by directly comparing the face image with face images in an entire database in the current technology can be avoided.

In a specific implementation process, an area to be monitored and a camera location in the monitored area are first determined. The monitored area is divided into a plurality of subareas, and a storage space of a memory is divided into a corresponding quantity of sub-storage spaces that are used as databases. Each subarea corresponds to one database, so that face images captured by all cameras in each subarea are compared with face images stored in a corresponding database. When the face images stored in the corresponding database do not include a face image of a photographed person corresponding to a face image captured by the camera, the comparison database is expanded, to compare face images stored in databases corresponding to several subareas around the subarea with the obtained face image. Compared with the manner of directly comparing a face image with all data in the database in the current technology, the manner of gradually expanding the comparison area significantly reduces a quantity of comparison times. In addition, a probability of face similarity in a small area is far less than that in a large area. Therefore, interference caused by similar faces is further avoided in this application, thereby improving clustering precision.

In an implementation, the method further includes: when a memory clarity value of the photographed person corresponding to the first face image is less than a specified threshold, deleting all face images that are of the photographed person corresponding to the first face image and that are in the second area in the database, where the memory clarity value indicates a frequency at which the photographed person corresponding to the first face image appears in the second area.

In this implementation, a memory clarity value $f_u$ of each photographed person is compared with the specified threshold. A face image of the photographed person with a memory clarity value $f_u$ less than the specified threshold in the database is deleted, to ensure that a face image of a person that frequently appears in a corresponding area is stored in a limited storage space of the memory.

In an implementation, the comparing the first face image with face images in a second area in the database includes:

comparing the first face image preferentially with a face image of a photographed person with a high memory clarity value in the second area in the database, and then comparing the first face image with a face image of a photographed person with a low memory clarity value.

In this implementation, face images of all photographed persons stored in the memory are sorted based on memory clarity values $f_u$, and the database is updated based on a result obtained by sorting, so that in a process of face image comparison, the face image of the photographed person with the high memory clarity value $f_u$ is preferentially compared with the obtained face image. Because the photographed person with the high memory clarity value $f_u$ appears more frequently, and is compared more frequently, comparison is performed in descending order of the memory clarity values $f_u$, so that a quantity of comparison times is effectively reduced.

In an implementation, after the obtaining the face image in the image data, the method further includes: obtaining a timestamp at which the first face image in the image data appears in the image data; and the method further includes: calculating, based on the timestamp of the first face image and a quantity of face images that are of the photographed person corresponding to the first face image and that are in the second area in the database, the memory clarity value of the photographed person corresponding to the first face image.

In this implementation, the memory clarity value $f_u$ of the face image of each photographed person is obtained, to ensure that the face image of the person that frequently appears in the corresponding area is stored in the limited storage space of the memory.

In an implementation, the memory clarity value includes a long-term memory value and/or a short-term memory value. The long-term memory value is determined based on the quantity of face images that are of the photographed person corresponding to the first face image and that are in the second area in the database, and the short-term memory value is determined based on the timestamp of the recently stored first face image.

In this implementation, the long-term memory means that a face image of a person that frequently appears in the area is cached by the memory 30 for a long time. The long-term memory is characterized in that a higher appearance frequency indicates a longer cache time. The short-term memory means that a face image of a person that appears in the area for a short period of time is cached by the memory 30 for a short period of time. The short-term memory is characterized by caching face images of all people that appear in the area for a short period of time.

In an implementation, a calculation method of the memory clarity value is specifically:

$$f_u = e^{\frac{T}{\rho s}} + \lambda e^{\frac{T-t}{s}},$$

where
f represents the memory clarity value, u represents a photographed person, ρ represents a quantity of face images of the photographed person u in the second area in the database, s represents a forgetting speed, T represents a current moment, t represents a timestamp of a recently stored face image of the photographed person u, λ represents an adjustment parameter, the first e on the right represents a long-term memory value, and the second e on the right represents a short-term memory value.

In an implementation, the comparing the first face image with a face image in a first area in a database includes: converting the first face image into a first vector, where the first vector is a software program recognizable vector; and comparing the first vector with a second vector of each face image in the first area in the database, where the second vector is a vector obtained by converting each face image in the first area in the database.

In an implementation, the method further includes: when the face images in the second area in the database do not include a face image of the photographed person corresponding to the first face image, comparing the face image with face images in a national identity card face image library.

In an implementation, the second area in the database further includes identity information of the photographed person corresponding to the first face image; and the method further includes: displaying the identity information of the photographed person corresponding to the first face image on a display screen.

In this implementation, after the identity information of the photographed person corresponding to the obtained face image is determined, the identity information of the photographed person is displayed on the display screen, so that management personnel determine, based on the identity information, whether the photographed person should appear in a current area. If the photographed person is not supposed to be in the area, the management personnel take measures such as dissuasion or closing a door of a building to perform management and control.

According to a second aspect, an embodiment of this application further provides an image management server, including at least one processor, where the processor is used to execute instructions stored in a memory, so that a terminal performs the method that may be implemented in the implementations of the first aspect.

According to a third aspect, an embodiment of this application further provides an image management apparatus. The apparatus includes: a transceiver unit, configured to receive image data sent by a first camera, where the image data includes at least one face image, and the at least one face image includes a first face image; a recognition unit, configured to obtain the first face image in the image data; and a processing unit, configured to compare the first face image with a face image in a first area in a database, where the database is a database storing face images in each area, and the first area is an area in which at least one camera including the first camera is located. When the face image in the first area in the database does not include a face image of a photographed person corresponding to the first face image, the first face image is compared with face images in a second area in the database, where the second area is an area obtained by expanding the first area around, the second area is an area in which a plurality of cameras including the first camera are located, and a quantity of cameras in the second area is greater than a quantity of cameras in the first area. When the face images in the second area in the database include a face image of the photographed person corresponding to the first face image, clustering is performed on the first face image and the face image of the photographed person corresponding to the first face image.

In an implementation, the processing unit is further configured to, when a memory clarity value of the photographed person corresponding to the first face image is less than a specified threshold, delete all face images that are of the photographed person corresponding to the first face image and that are in the second area in the database, where the memory clarity value indicates a frequency at which the photographed person corresponding to the first face image appears in the second area.

In an implementation, the processing unit is specifically configured to compare the first face image preferentially with a face image of a photographed person with a high memory clarity value in the second area in the database, and then compare the first face image with a face image of a photographed person with a low memory clarity value.

In an implementation, the transceiver unit is further configured to obtain a timestamp at which the first face image in the image data appears in the image data; and the processing unit is further configured to calculate, based on the timestamp of the first face image and the quantity of face images that are of the photographed person corresponding to the first face image and that are in the second area in the database, the memory clarity value of the photographed person corresponding to the first face image.

In an implementation, the memory clarity value includes a long-term memory value and/or a short-term memory value. The long-term memory value is determined based on the quantity of face images that are of the photographed person corresponding to the first face image and that are in the second area in the database, and the short-term memory value is determined based on the timestamp of the recently stored first face image.

In an implementation, the second area in the database further includes identity information of the photographed person corresponding to the first face image; and the processing unit is further configured to display the identity information of the photographed person corresponding to the first face image on a display screen.

According to a fourth aspect, an embodiment of this application further provides a terminal device, configured to perform the method that may be implemented in the implementations of the first aspect.

According to a fifth aspect, an embodiment of this application further provides a computer-readable storage medium, where the computer-readable storage medium stores a computer program, and when the computer program is executed in a computer, the computer is enabled to perform the method that may be implemented in the implementations of the first aspect.

According to a sixth aspect, an embodiment of this application further provides a computing device. The device includes a memory and a processor, where the memory stores executable code, and when executing the executable code, the processor implements the method that may be implemented in the implementations of the first aspect.

According to a seventh aspect, an embodiment of this application further provides an image management system, including at least one camera, a memory, and a processor configured to perform the method that may be implemented in the implementations of the first aspect.

BRIEF DESCRIPTION OF DRAWINGS

The following briefly describes the accompanying drawings that are used in the descriptions of the embodiments or the current technology.

DETAILED DESCRIPTION

To implement a clustering method according to an aspect provided in this application, related hardware devices may be classified into three types, including a remote device, a processing device, and a storage device.

The remote device is a device with a camera function, for example, a camera, a face recognition payment device, or a security check device. In this application, a main function of the remote device is to photograph a specified area, generate a video stream (or an image), store the generated video stream in a memory carried in the remote device, and then periodically send the generated video stream to the processing device, or send the generated video stream to the processing device in real time by using a communications unit carried in the remote device. In embodiments of the present application, a video stream and an image are collectively referred to as image data. The following uses the video stream as an example for description.

According to an application scenario, the remote device further includes some auxiliary apparatuses. For example, when the remote device is a subway security check device, the remote device further includes a gate apparatus that controls, by receiving an "on signal" or an "off signal" sent by the processing device, a gate in the gate apparatus to be lowered or folded.

The processing device is a device with a computing function, for example, a central processing unit (CPU) or a computer, or may even be a cloud server. In this application, the processing device is mainly configured to: extract a face image in a video stream by receiving the video stream, compare the face image with an existing face image, determine identity information of a photographed person corresponding to the face image in the video stream, and cluster the face image in the video stream.

The storage device is used as a database for performing face image comparison by the processing device, and has a storage function. The storage device may be various memories, cloud servers, or the like. In this application, the storage device is configured to store data such as face images of each photographed person, or a face feature set of each photographed person, or a human face feature set, so that the processing device performs face feature comparison.

In addition, according to an implementation scenario of the clustering method provided in this application, one or more of the remote device, the processing device, and the storage device may be selected for combination. A specific classification is as follows.

1. In scenarios such as clock-in/out in an enterprise and face unlock, because a quantity of users in units such as a residential area or the enterprise is limited, the storage device does not need to store much data. Therefore, the remote device, the processing device, and the storage device can be combined to exist as a whole. Such devices include a face recognition time clock, a mobile phone, a tablet, and the like.

2. In scenarios such as security check and surveillance, because a large quantity of remote devices are required and need to be distributed in different areas, the remote devices can exist independently. A remote processing device and the storage device can be combined, or separated from each other. Such devices include a residential access control device, devices that constitute an enterprise monitoring system, and the like.

3. In a face recognition payment scenario, because security and confidentiality are considered, the processing device and the remote device need to be combined to exist as a whole, to avoid a security problem caused by transmission of a face image that the remote device obtains to another processing device. In addition, the storage device needs to exist independently, to avoid unauthorized tampering with data stored in the database incurred by placing the storage device together with the processing device and the remote device. Such devices include devices that constitute the face recognition payment device.

Figure 1:
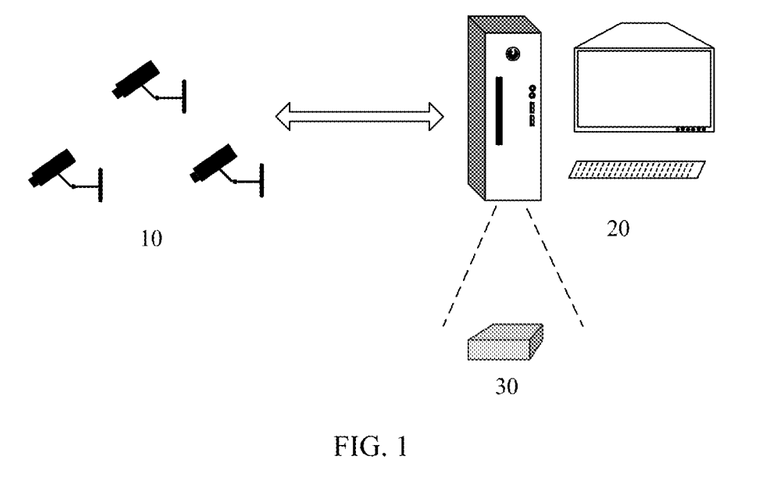
FIG. 1 is a schematic diagram of a system architecture for implementing clustering according to an embodiment of this application.

FIG. 1 is a schematic diagram of a system architecture for implementing clustering according to an embodiment of this application. As shown in FIG. 1, the system includes a plurality of cameras 10, a user side controlled terminal device 20, and a memory 30. The terminal device 20 includes the memory 30. The terminal device 20 may be a computer, a notebook computer, a smart phone, or the like.

After installing the cameras 10 at key locations such as an intersection in each area, a doorway, or a corridor lamp, a technician reports an installation location of each camera 10 to the terminal device 20, or the terminal device 20 determines the location of each camera 10 based on a positioning unit in each camera 10.

In a monitoring process, the terminal device 20 determines an area to be monitored and a database in the memory 30, and constructs a spatial—temporal memory database, to be specific, divides the monitored area into a plurality of subareas. In addition, the terminal device 20 also divides a storage space of the memory 30 into a plurality of sub-storage spaces, and uses the sub-storage spaces as databases. Then each subarea is associated with each database, so that a face image captured by the camera 10 in each subarea is compared with a face image stored in the associated database, and the face image captured by the camera 10 is stored.

In addition, the terminal device 20 groups N adjacent subareas into a second-level area, and correspondingly, groups N associated databases into a second-level database, so that a plurality of second-level areas are formed in the monitored area and a corresponding quantity of second-level databases are formed in the memory 30. By analogy, the terminal device 20 sequentially forms a larger area by grouping a previous-level area and a plurality of subareas around the previous-level area, and also forms a larger database by grouping a plurality of corresponding associated databases.

Figure 2:
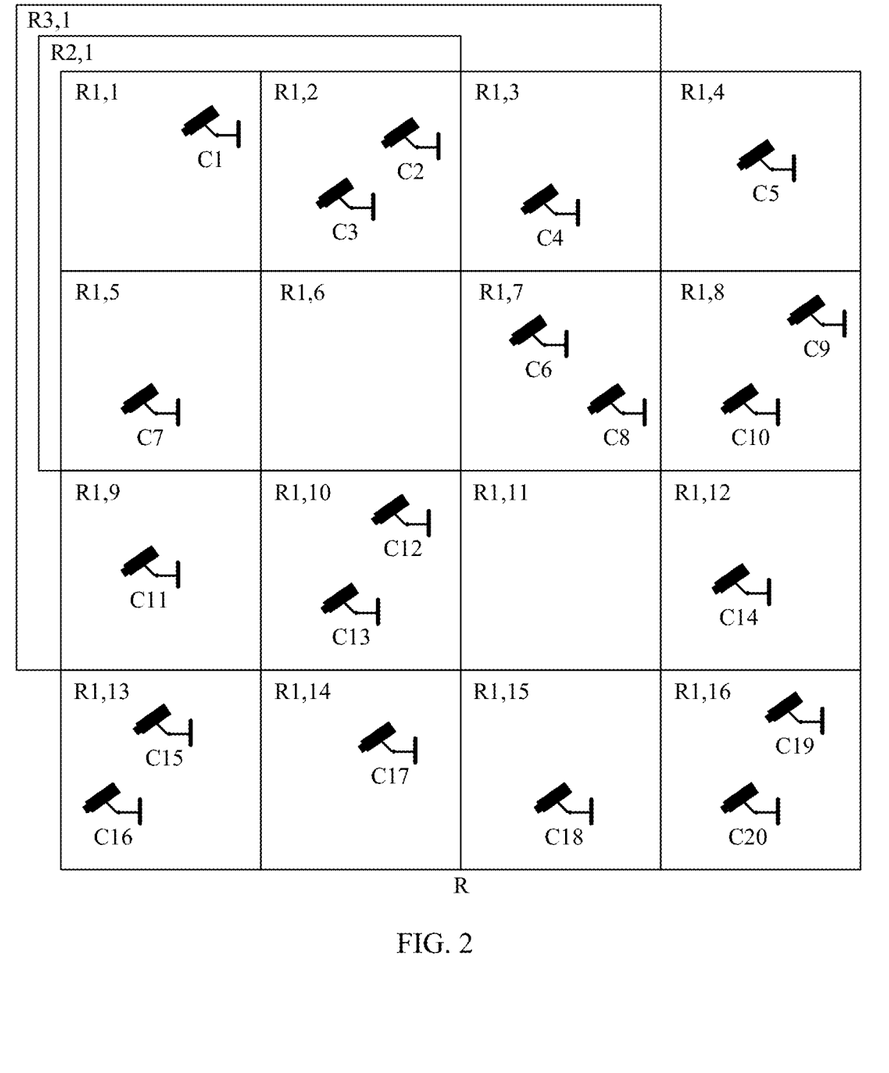
FIG. 2 is a schematic diagram of division of a determined area according to an embodiment of this application.

For example, as shown in FIG. 2, after determining an area R to be monitored, the terminal device 20 divides the area R into 16 subareas, which are $R_{1,1}, R_{1,2}, R_{1,3}, R_{1,4}, \ldots, R_{1,16}$. For $R_{1,1}$, three adjacent subareas $R_{1,2}, R_{1,5}$, and $R_{1,6}$ are grouped together with $R_{1,1}$ to form a second-level area $R_{2,1}$; five subareas $R_{1,3}, R_{1,7}, R_{1,9}, R_{1,10}$, and $R_{1,11}$ around the second-level area $R_{2,1}$ are grouped together with $R_{2,1}$ to form a third-level area $R_{3,1}$; seven subareas $R_{1,4}, R_{1,8}, R_{1,12}, R_{1,13}, R_{1,14}, R_{1,15}$, and $R_{1,16}$ around the third-level area $R_{3,1}$ are grouped together with $R_{3,1}$ to form a fourth-level area $R_{4,1}$ (that is, the area R).

Similarly, the storage space of the memory 30 is divided into 16 sub-storage spaces that are used as 16 databases, which are $K_{1,1}, K_{1,2}, K_{1,3}, K_{1,4}, \ldots$, and $K_{1,16}$. Then, based on the composition of the second-level area, databases corresponding to the subareas of the second-level area constitute a second-level database $K_{2,n}$, and by analogy, a third-level database $K_{3,n}$ and a fourth-level database $K_{4,n}$ are sequentially constructed.

For the memory 30, when the memory 30 is being initialized, face feature sets and/or face images of a specific quantity of photographed persons and identity information of the photographed persons, such as names, genders, companies, and home addresses, may be input in the storage space of the memory 30 in advance. Alternatively, no face feature set and/or face image of any photographed person is input in advance. If face feature sets of a specific quantity of photographed persons have been input in the memory 30 in advance, when a plurality of databases are obtained by division, in a possible implementation, based on areas in which each photographed person frequently appears, the face feature sets of the photographed persons input in advance are stored respectively in databases corresponding to the areas in which the photographed persons frequently appear. In another possible implementation, the face feature sets of the photographed persons input in advance are directly stored in the databases. If no face feature set of any photographed person is input in advance in the memory 30, there is no face feature set of any photographed person in each database.

In addition, if the memory 30 is used as an internal storage, persistence processing does not need to be performed when a face image is subsequently stored. If the memory 30 is used as an external storage, when face image comparison is performed, the terminal device 20 invokes, from the memory 30 to an internal storage, a face image in a database corresponding to an area in which the face image to be compared is located, to perform face image comparison. When the face image is subsequently stored, because the face image is initially cached in the internal storage, persistence processing is required, and the face image stored in the internal storage is stored in the memory 30.

Figure 3:
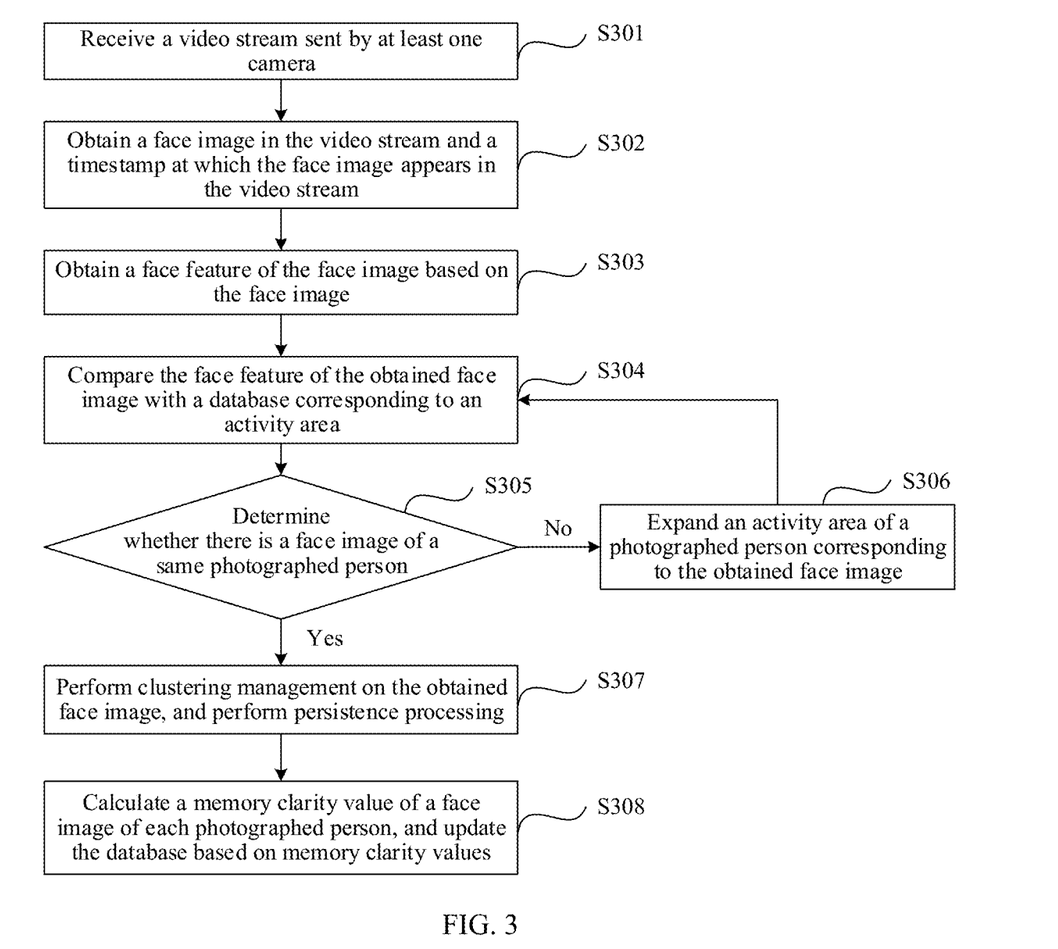
FIG. 3 is a flowchart of image management according to an embodiment of this application.
Figure 4:
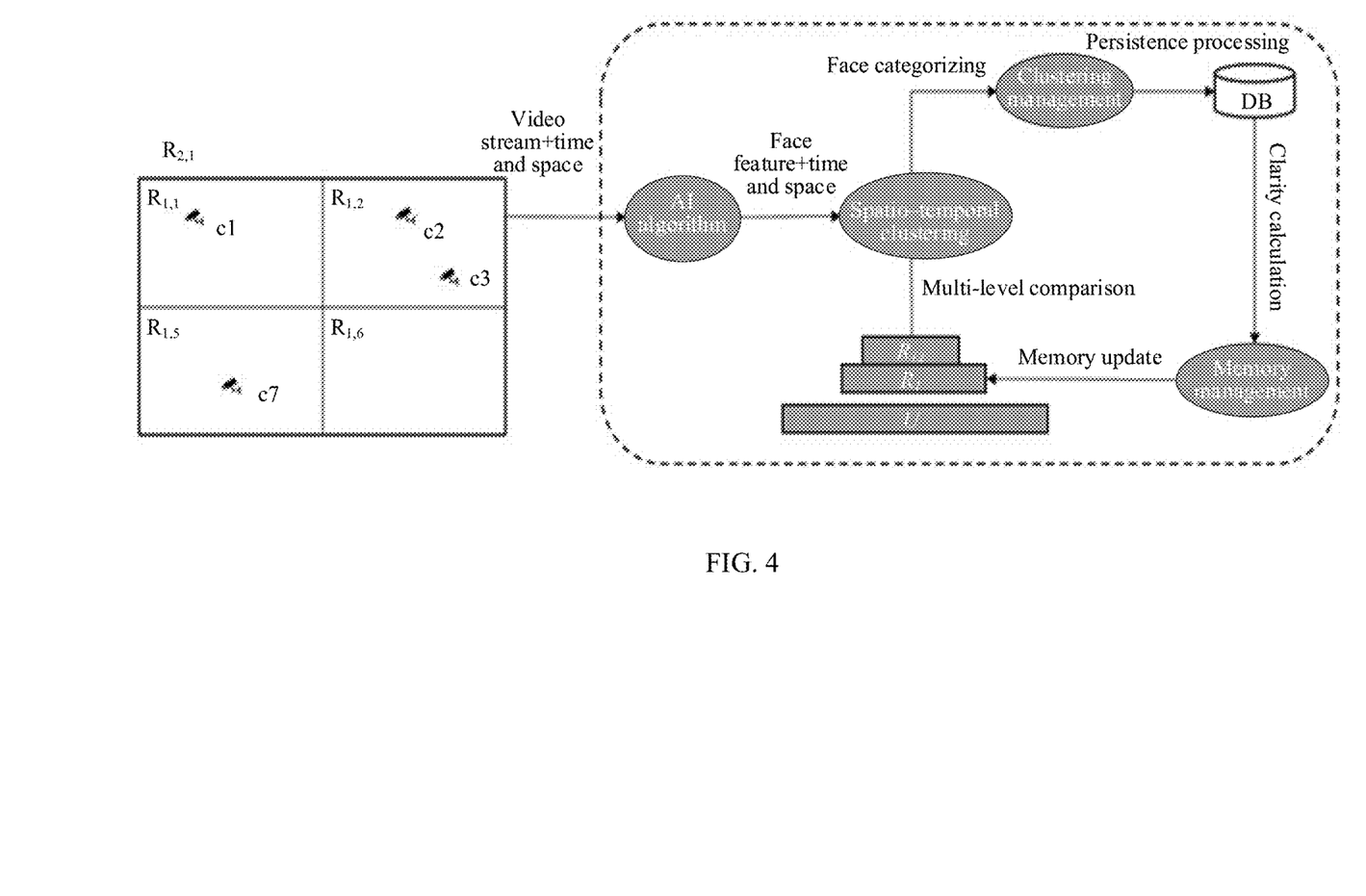
FIG. 4 is a framework of image management according to an embodiment of this application.

In a flowchart shown in FIG. 3 and a schematic diagram of an architecture shown in FIG. 4, a specific implementation process in which the terminal device 20 performs face image clustering after constructing the spatial-temporal memory database is as follows.

S301: Receive a video stream sent by at least one camera 10.

Specifically, when sending a video stream to the terminal device 20, each camera 10 carries identification information of camera 10 in the video stream, so that after receiving the video stream, the terminal device 20 determines, based on the identification information, a camera 10 that sends the received video stream. Further, a subarea in which the camera 10 is located is determined.

S302: Obtain a face image in the video stream and a timestamp at which the face image appears in the video stream.

Specifically, the terminal device 20 performs face recognition on the video stream received in real time by using a face recognition technology, to recognize the face image that appears in the video stream. When the terminal device 20 recognizes a face in the video stream, the terminal device 20 extracts a face image of the face from the video stream, and records a timestamp at which the face image appears in the video stream, to subsequently calculate a memory clarity value of each photographed person.

The face recognition technology is a biological feature recognition technology, and distinguishes an organism (usually, a human) based on a biological feature of the organism. The face recognition technology first determines, based on face features of a human, whether there is a face in an input face image or an input video stream. If there is a face, a position and size of each face and position information of each main face organ are further provided to obtain a face image. In this application, the face recognition technology may be any one of existing face recognition based on a geometric feature, face recognition based on eigenface principal component analysis (PCA), face recognition based on a neural network, face recognition based on elastic bunch graph matching, face recognition based on a line segment Hausdorff distance (LHD), and face recognition based on a support vector machine (SVM).

Optionally, the process implemented in S302 may be executed by the camera 10 that sends the video stream. In this case, in S301, the camera 10 only needs to send the face image and the timestamp at which the face image appears in the video stream to the terminal device 20, thereby greatly reducing a data amount that each camera 10 needs to send.

S303: Obtain a face feature of the face image based on the face image.

For example, after obtaining the face image, the terminal device 20 performs processing on the face image, such as removing noises and searching for key points (for example, a position of a corner of an eye, a position of a nose, contour points of a face). After the processing, the processed face image is input to a deep convolutional network, and is converted into and represented as a vector (128, 256, 512, or another dimension).

After the vector corresponding to the face image is obtained, based on a principle that a distance between vectors corresponding to face images of a same photographed person is small and a distance between vectors corresponding to face images of different photographed persons is large, the following applications may be implemented.

1. Face identification: To detect whether a face image A and a face image B belong to a same person, only a distance between vectors corresponding to the two face images needs to be calculated and an appropriate threshold is set. Then, it is determined whether the distance between the two vectors is greater than the threshold. If the distance is greater than the threshold, it indicates that the face image A and the face image B do not belong to a same person. If the distance is not greater than the threshold, it indicates that the face image A and the face image B belong to a same person.
2. Face recognition: When a face image A is given, a face image corresponding to a vector whose distance is closest to a vector corresponding to the face image A is searched for in a database, and is used as a recognition result.
3. Image management (face clustering): Cluster faces in a database. For example, by using a k-means clustering algorithm (K-Means), K face images are randomly selected as an initial clustering center. Then, a distance between a vector corresponding to each face image and a vector corresponding to each face image in the clustering center is calculated. Each face image is allocated to a nearest face image in the clustering center.

S304: Compare the face feature of the obtained face image with a database corresponding to an activity area. For example, an eigenvector of the obtained face image is compared with an eigenvector of a face in the database. A face eigenvector used for comparison may be prestored in the database.

S305: Determine whether there are face images of a same photographed person; and if no, perform S306; or if yes, perform S307.

Figure 5:
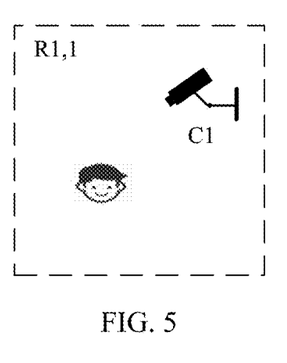
FIG. 5 is a schematic diagram of a scenario in which a face image is captured in an area $R_{1,1}$ according to an embodiment of this application.

For example, as shown in FIG. 5, after the terminal device 20 determines, based on the identification information of the camera 10 carried in the video stream, that the video stream is sent by a camera C1, the terminal device 20 determines, based on preset location information, that a subarea in which the camera C1 is located is $R_{1,1}$, that is, an activity area of the photographer person corresponding to the face image. Then a database $K_{1,1}$ corresponding to the subarea $R_{1,1}$ is determined.

In the description about the memory 30, it has been mentioned that when the memory 30 is being initialized, there are two cases: One is that face feature sets and/or face images of a specific quantity of photographed persons are input in advance; the other one is that no face feature set and/or face image of any photographed person is input in advance. For the first case, after determining the database $K_{1,1}$, the terminal device 20 calculates a distance between the obtained vector corresponding to the face image in S303 and each vector of the photographed person stored in the database $K_{1,1}$. Then a minimum distance value in distance values between two vectors is compared with the threshold. If the minimum distance value is greater than the threshold, it indicates that, in the database $K_{1,1}$, there is no face feature set and/or face image of the photographed person corresponding to the face image obtained in S302. Then S306 is performed. If the minimum distance value is not greater than the threshold, it indicates that, in the database $K_{1,1}$, there are face feature sets and/or face images of the photographed person corresponding to the face image obtained in S302. Further, the identity information of the photographed person corresponding to the face image obtained in S302 is determined. Then S307 is performed.

If only face images are stored in each database, when comparing the face images, the terminal device 20 calculates, based on all face images of a same photographed person in the database, a corresponding vector of the face feature of the photographed person, and then performs comparison.

For example, in the monitoring scenario, after the terminal device determines the identity information of the photographed person corresponding to the face image obtained in S302, the identity information of the photographed person is displayed on a display screen, so that management personnel determine, based on the identity information, whether the photographed person should appear in the current area $R_{1,1}$. If the photographed person is not supposed to be in the area $R_{1,1}$, the management personnel take measures such as dissuasion or closing a door of a building to perform management and control.

For the second case, because no face image is stored in the storage space, the terminal device 20 does not need to perform comparison, and directly performs S305.

S306: Expand the activity area of the photographed person corresponding to the obtained face image, that is, expand the activity area of the photographed person from a first area to a second area.

For example, the terminal device 20 expands a possible activity area of the photographed person based on the activity area $R_{1,1}$ of the photographed person corresponding to the face image obtained in S302. The activity area of the photographed person is expanded to the second-level area $R_{2,1}$ composed of the area $R_{1,1}$ and the adjacent areas $R_{1,2}$, $R_{1,5}$, and $R_{1,6}$ of the area $R_{1,1}$. Then S304 is performed. In this case, the "database corresponding to an activity area" in S304 is expanded to a corresponding database that includes the areas $R_{1,1}$, $R_{1,2}$, $R_{1,5}$, and $R_{1,6}$ (that is, a second-level database $K_{2,1}$).

It should be noted that, because the area $R_{2,1}$ includes the area $R_{1,1}$, and the area $R_{1,1}$ have been compared in S304, there may be two options when face images corresponding to the area $R_{2,1}$ are compared: (1) Comparison is performed only on areas that do not include the area $R_{1,1}$ in the area $R_{2,1}$, that is, comparison is performed on the areas $R_{1,2}$, $R_{1,5}$, and $R_{1,6}$. (2) Comparison is performed on all areas including the area $R_{1,1}$ in the area $R_{2,1}$, that is, comparison is performed on the areas $R_{1,1}$, $R_{1,2}$, $R_{1,5}$, and $R_{1,6}$. Both options provide a full comparison of the area $R_{2,1}$. If there is still no face feature set and/or face image of the photographed person corresponding to the face image obtained in S302 in the second-level database $K_{2,1}$, the possible activity area of the photographed person is further expanded to the third-level area, the fourth-level area, and the like. The corresponding comparison database is expanded to the third-level database, the fourth-level database, and the like, until the face feature sets and/or the face images of the photographed person corresponding to the face image obtained in S302 can be found.

If the face feature sets and/or the face images of the photographed person corresponding to the face image obtained in S302 cannot be found in the memory 30, the terminal device 20 may send the face image obtained in S302 to a national identity card face image library for comparison, to determine the identity information of the photographed person corresponding to the face image obtained in S302.

S307: Perform clustering management on the obtained face image. Clustering management is to classify different images of a same object into a same category. In this step (or a previous step), a first face image is recorded in the database. The recording herein may be storing the first face image, or may be storing an eigenvalue of the first face image.

In this embodiment, after comparison, the face image (the first face image) in the video stream and a face image recorded in the database are found to be face images of a same photographed person. Then clustering is performed on the two images, that is, both images are marked as the images of the photographed person. In a more specific implementation, the first face image (or the eigenvalue of the first face image, for example, an eigenvector of the first face image) is stored in the database in a category of a photographed person to which a same face image that is compared with the first face image and that is in the second area belongs, or the first face image is set near the face image of the photographed person. Then persistence processing is performed.

Specifically, if there are face feature sets and/or face images of the photographed person corresponding to the face image obtained in S302 in the database $K_{1,1}$, the face image obtained in S302 is assigned to a category of a photographed person to which the face image belongs in the database $K_{1,1}$, and the face image is set near a face image stored in the database $K_{1,1}$ with a minimum vector distance value.

Specifically, if there are face feature sets and/or face images of the photographed person corresponding to the face image obtained in S302 in the second-level database $K_{2,1}$, the face image obtained in S302 is assigned to a category of a photographed person to which the face image belongs in the database $K_{1,1}$, and the face image is set near a face image stored in the database $K_{2,1}$ with a minimum vector distance value. In addition, the face image obtained in S302 and the identity information of the photographed person corresponding to the face image are stored in the database $K_{1,1}$, so that when the camera C1 subsequently captures a face image of the photographed person again, the identity information of the photographed person can be confirmed in the database $K_{1,1}$. For the third-level area and the fourth-level area, the rule applies.

Persistence means storing data (for example, an object in an internal storage) in a storage device (for example, a disk, a solid state drive, or a tape) that can be used for long-time storing. Main application of persistence is to store the object in the internal storage in a database, or store the object in a disk file, an XML data file, and the like. In this application, after the face image is obtained, the face image is cached in the internal storage. After it is determined that a corresponding database stores the face feature sets and/or the face images of the photographed person corresponding to the obtained face image, the obtained face image is stored in the external storage, the memory 30.

S308: Calculate the memory clarity value of the face image of each photographed person, and update the database based on the memory clarity values.

For example, the database $K_{1,1}$ is used as an example. When the database $K_{1,1}$ stores related information of the photographed person corresponding to the face image obtained in S302, the terminal device 20 calculates the memory clarity value of the photographed person based on a quantity of face images of the photographed person stored in the database $K_{1,1}$ and the timestamp of the recently stored face image of the photographed person. A specific calculation process is as follows:

$$f_u = e^{\frac{T}{\rho s}} + \lambda e^{\frac{T-t}{s}} \qquad (1)$$

In this formula, f represents a memory clarity value, u represents each photographed person, $\rho$ represents a quantity of face images of the photographed person u stored in the database corresponding to the area $R_{1,1}$, s represents a forgetting speed, T represents a current moment, t represents a time at which a recently stored face image of the photographed person u appears in a video stream, and $\lambda$ represents an adjustment parameter.

According to the formula (1), it can be learned that the first e represents long-term memory, and the long-term memory means that a face image of a person that frequently appears in the area is cached by the memory 30 for a long time. The long-term memory is characterized in that a higher appearance frequency indicates a longer cache time. The second e represents short-term memory. The short-term memory means that a face image of a person that appears in the area for a short period of time is cached by the memory 30 for a short period of time. The short-term memory is characterized by caching face images of all people that appear in the area for a short period of time.

Figure 6:
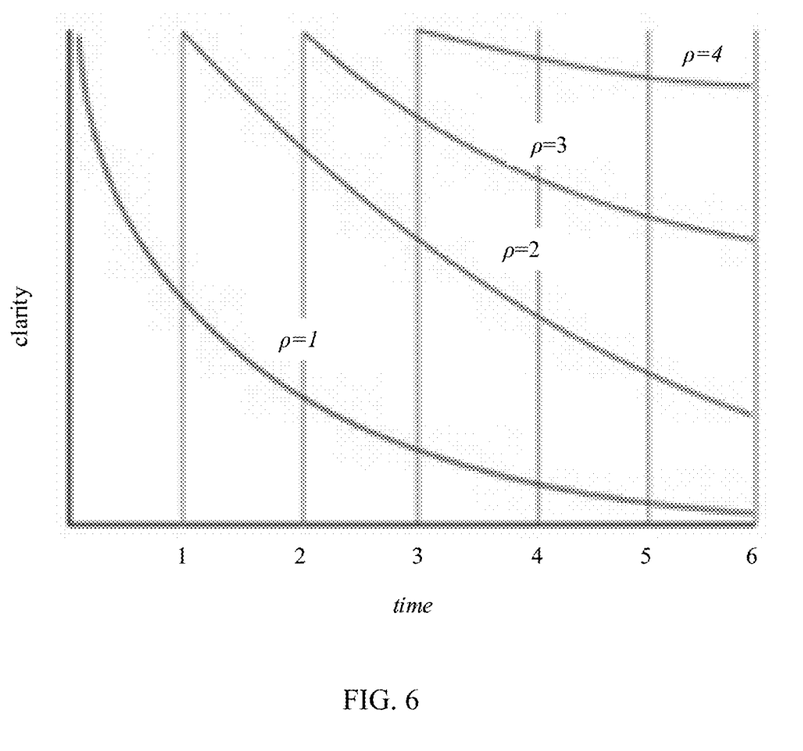
FIG. 6 is a schematic diagram of a curve change of long-term memory according to an embodiment of this application.

In addition, it can be learned from the formula that a larger quantity $\rho$ of face images of each photographed person indicates a higher long-term memory value and a higher $f_u$ value; and a closer time between the photographed person's latest appearances in a corresponding area indicates a higher short-term memory value and a higher $f_u$ value. Over time, both the long-term and the short-term memory decay, and the short-term memory decays faster than the long-term memory. For intuitive understanding of a decaying process, reference is made to a function curve $$e^{\frac{T}{\rho s}}$$

shown in FIG. 6. The short-term memory can be considered as a special case of the long-term memory when t=0 and ρ=1.

After obtaining the memory clarity value $f_u$ of the face image of each photographed person, the terminal device 20 first compares the memory clarity value $f_u$ of each photographed person with a specified threshold. A face image of the photographed person with a memory clarity value $f_u$ less than the specified threshold in the database is deleted, to ensure that a face image of a person that frequently appears in a corresponding area is stored in the limited storage space of the memory 30.

The terminal device 20 further sorts face images of all photographed persons stored in the memory 30 based on memory clarity values $f_u$, and the database is updated based on a result obtained by sorting, so that in a process of face image comparison, a face image of the photographed person with a high memory clarity value $f_u$ is preferentially compared with the obtained face image. Because the photographed person with the high memory clarity value $f_u$ appears more frequently, and is compared more frequently, comparison is performed in descending order of the memory clarity values $f_u$, so that a quantity of comparison times is effectively reduced.

In this application, the terminal device 20 first determines the area to be monitored and the camera location in the monitored area. The monitored area is divided into the plurality of subareas, and the storage space of the memory 30 is divided into the corresponding quantity of sub-storage spaces that are used as the databases. Each subarea corresponds to one database, so that face images captured by all cameras in each subarea are compared with face images stored in a corresponding database. When there is no face image of the photographed person corresponding to the face image captured by the camera in the face images stored in the corresponding database, the terminal device 20 expands the comparison database, to compare the face images stored in the databases corresponding to several subareas around the subarea with the obtained face image. Compared with the manner of directly comparing a face image with all data in the database in the current technology, the manner of gradually expanding the comparison area significantly reduces a quantity of comparison times. In addition, a probability of face similarity in a small area is far less than that in a large area. Therefore, interference caused by similar faces is further avoided in this application, thereby improving clustering precision.

In addition, in this application, when the face image in the video stream is obtained, the timestamp at which the face image appears in the video stream is further recorded. After the face image is stored in a corresponding database, the terminal device 20 calculates the memory clarity value of each photographed person based on a quantity of face images of a same person stored in the database and the timestamp of the recently stored face image, deletes some face images of the photographed person with a relatively low memory clarity value based on the memory clarity values, to reduce a storage amount of the database, and finally sorts the face images of the photographed person based on the memory clarity values. The face images of the photographed person with a large memory clarity value are preferentially compared with the obtained face image, thereby further reducing a quantity of comparison times.

Figure 7:
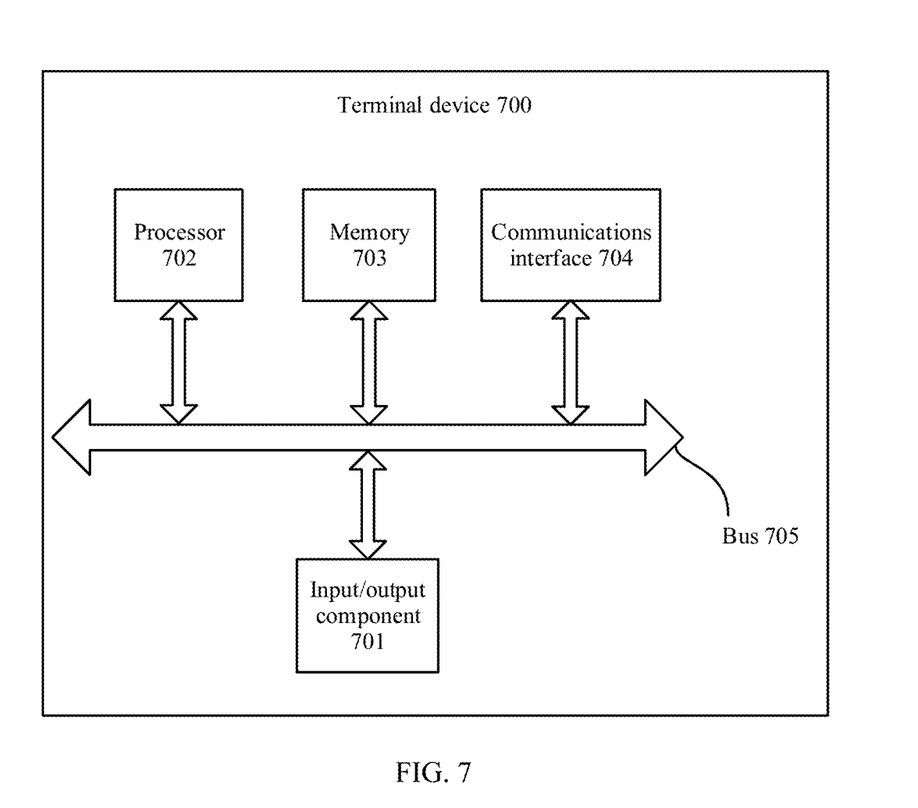
FIG. 7 is a schematic diagram of a structure of a terminal device according to an embodiment of this application.

FIG. 7 is a schematic diagram of a structure of a terminal device according to an embodiment of this application. The terminal device is, for example, a camera and a server. The terminal device 700 is shown in FIG. 7. The terminal device 700 may be the terminal device 20, and may include an input/output component 701, a processor 702, a memory 703, a communications interface 704, and a bus 705. The processor 702, the memory 703, and the communications interface 704 in the terminal device 700 may establish a communication connection by using the bus 705.

The input/output component 701 may be a display, a loudspeaker, a microphone, or the like, and is configured to receive or send information such as instructions or data. For example, when used as the display, the input/output component 701 can display identity information of a photographed person. When used as the loudspeaker, the input/output component 701 can issue a warning sound signal according to an instruction.

The processor 702 may be a central processing unit (CPU). In the foregoing embodiment, a specific implementation process of clustering face images described in FIG. 3 is all executed by the processor 702.

The memory 703 may include a volatile memory, such as a random-access memory (RAM); or the memory 703 may include a non-volatile memory, such as a read-only memory (ROM), a flash memory, a hard disk drive (HDD), or a solid state drive (SSD); or the memory 703 may further include a combination of the foregoing types of memories. Data such as a video stream, a face image, and a database is stored in the memory 703. In addition, the memory 703 is further configured to store corresponding program instructions and the like that are executed by the processor 702 to implement the image management method described in the foregoing embodiment.

For this embodiment of this application, the memory 703 may be the memory 30 described in FIG. 1 to FIG. 6, or may include the memory 30 described in FIG. 1 to FIG. 6.

The communications interface 704 may be a communications unit such as a Bluetooth module, a Wi-Fi module, or a P5 interface, and is configured to receive or send information such as data and instructions, for example, to receive a video stream in this embodiment of this application.

Figure 8:
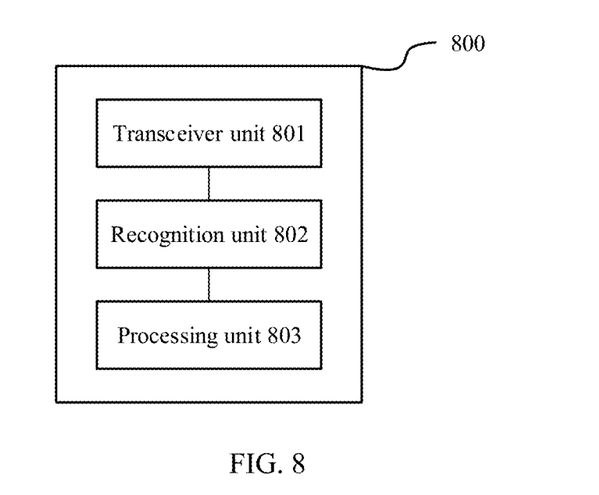
FIG. 8 is a schematic diagram of a structure of an image management apparatus according to an embodiment of this application.

FIG. 8 is a schematic diagram of a structure of an image management apparatus according to an embodiment of this application. As shown in FIG. 8, the apparatus 800 includes a transceiver unit 801, a recognition unit 802, and a processing unit 803.

The transceiver unit 801 is configured to receive a video stream sent by a first camera, where the video stream includes at least one face image, and the at least one face image includes a first face image.

The recognition unit 802 is configured to obtain the first face image in the video stream.

The processing unit 803 is configured to compare the first face image with a face image in a first area in a database, where the database is a database storing face images in each area, and the first area is an area in which at least one camera including the first camera is located; when the face image in the first area in the database does not include a face image of a photographed person corresponding to the first face image, compare the first face image with face images in a second area in the database, where the second area is an area obtained by expanding the first area around, the second area is an area in which a plurality of cameras including the first camera are located, and a quantity of cameras in the second area is greater than a quantity of cameras in the first area; and when the face images in the second area in the database include a face image of the photographed person corresponding to the first face image, cluster the first face image and the face image of the photographed person corresponding to the first face image.

In a possible embodiment, the processing unit 803 is further configured to, when a memory clarity value of the photographed person corresponding to the first face image is less than a specified threshold, delete all face images that are of the photographed person corresponding to the first face image and that are in the second area in the database, where the memory clarity value indicates a frequency at which the photographed person corresponding to the first face image appears in the second area.

In a possible embodiment, the processing unit 803 is specifically configured to compare the first face image preferentially with a face image of a photographed person with a high memory clarity value in the second area in the database, and then compare the first face image with a face image of a photographed person with a low memory clarity value.

In a possible embodiment, the transceiver unit 801 is further configured to obtain a timestamp at which the first face image in the video stream appears in the video stream; and the processing unit 803 is further configured to calculate, based on the timestamp of the first face image and a quantity of face images that are of the photographed person corresponding to the first face image and that are in the second area in the database, the memory clarity value of the photographed person corresponding to the first face image.

In a possible embodiment, the memory clarity value includes a long-term memory value and/or a short-term memory value. The long-term memory value is determined based on the quantity of face images that are of the photographed person corresponding to the first face image and that are in the second area in the database, and the short-term memory value is determined based on the timestamp of the recently stored first face image.

In a possible embodiment, the second area in the database further includes identity information of the photographed person corresponding to the first face image; and the processing unit 803 is further configured to display the identity information of the photographed person corresponding to the first face image on a display screen.

The present application provides a computer-readable storage medium, where the computer-readable storage medium stores a computer program, and when the computer program is executed on a computer, the computer is enabled to implement any one of the foregoing methods.

The present application provides a computing device, including a memory and a processor, where the memory stores executable code, and when executing the executable code, the processor implements any one of the foregoing methods.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the embodiments of this application.

In addition, aspects or features in embodiments of this application may be implemented as a method, an apparatus, or a product that uses standard programming and/or engineering technologies. The term "product" used in this application covers a computer program that can be accessed from any computer-readable device, carrier or medium. For example, the computer-readable medium may include but is not limited to a magnetic storage component (for example, a hard disk drive, a floppy disk, or a magnetic tape), an optical disc (for example, a compact disc (CD) or a digital versatile disc DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to radio channels and various other media that can store, include, and/or carry instructions and/or data.

In the foregoing embodiment, the image management apparatus 800 shown in FIG. 8 may be implemented in whole or in part by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general purpose computer, a dedicated computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid state drive (SSD)), or the like.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

When the functions are implemented in the form of a software functional unit and sold or used as an independent product, the functions may be stored in a computer-readable storage medium. Based on such an understanding, the technical solutions of the embodiments of this application essentially, or the part contributing to the current technology, or some of the technical solutions may be implemented in a form of a software product. The computer software product is stored in a storage medium, and includes several instructions for instructing a computer device (which may be a personal computer, a server, or an access network device) to perform all or some of the steps of the methods described in embodiments of this application. The storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. An image management method, the method comprising:
   receiving image data sent by a first camera, the image data comprising at least one face image, and the at least one face image comprising a first face image;
   obtaining the first face image in the image data;
   comparing the first face image with a face image in a first area in a database, the database being a database storing face images in each area, and the first area being an area in which at least one camera comprising the first camera is located;
   based upon determining that the face image in the first area in the database does not comprise a face image of a photographed person corresponding to the first face image, comparing the first face image with face images in a second area in the database, the second area being an area obtained by expanding around the first area, the second area being an area in which a plurality of cameras comprising the first camera are located, and a quantity of cameras in the second area being greater than a quantity of cameras in the first area; and
   based upon determining that the face images in the second area in the database comprise a face image of the photographed person corresponding to the first face image, clustering the first face image and the face image of the photographed person corresponding to the first face image.

2. The method according to claim 1, wherein the method further comprises:
   based upon determining that a memory clarity value of the photographed person corresponding to the first face image is less than a specified threshold, deleting all face images that are of the photographed person corresponding to the first face image and that are in the second area in the database, and
   wherein the memory clarity value indicates a frequency at which the photographed person corresponding to the first face image appears in the second area.

3. The method according to claim 1, wherein the comparing the first face image with face images in the second area in the database comprises:
   comparing the first face image preferentially with a face image of the photographed person with a high memory clarity value in the second area in the database, and then comparing the first face image with a face image of theft photographed person with a low memory clarity value.

4. The method according to claim 1,
   wherein after the obtaining the first face image in the image data, the method further comprises: obtaining a timestamp at which the first face image in the image data appears in the image data, and
   wherein the method further comprises: calculating, based on the timestamp of the first face image and a quantity of face images that are of the photographed person corresponding to the first face image and that are in the second area in the database, the memory clarity value of the photographed person corresponding to the first face image.

5. The method according to claim 1, wherein a memory clarity value comprises a long-term memory value or a short-term memory value, the long-term memory value is determined based on the quantity of face images that are of the photographed person corresponding to the first face image and that are in the second area in the database, and the short-term memory value is determined based on the timestamp of the recently stored first face image.

6. The method according to claim 1, wherein the method further comprises:
   based upon determining that the face images in the second area in the database do not comprise a face image of the photographed person corresponding to the first face image, comparing the face image with face images in a national identity card face image library.

7. The method according to claim 1,
   wherein the database further comprises identity information of the photographed person corresponding to the first face image, and
   the method further comprises: displaying the identity information of the photographed person corresponding to the first face image on a display screen.

8. A computing device, the computing device comprising:
   a memory storing computer executable instructions; and
   a processor connected to the memory and configured to execute the computer executable instructions to perform operations comprising:

receiving image data sent by a first camera, the image data comprising at least one face image, and the at least one face image comprising a first face image;

obtaining the first face image in the image data;

comparing the first face image with a face image in a first area in a database, the database being a database storing face images in each area, and the first area being an area in which at least one camera comprising the first camera is located;

based upon determining that the face image in the first area in the database does not comprise a face image of a photographed person corresponding to the first face image, comparing the first face image with face images in a second area in the database, the second area being an area obtained by expanding around the first area, the second area being an area in which a plurality of cameras comprising the first camera are located, and a quantity of cameras in the second area being greater than a quantity of cameras in the first area; and based upon determining that the face images in the second area in the database comprise a face image of the photographed person corresponding to the first face image, clustering the first face image and the face image of the photographed person corresponding to the first face image.

9. The device according to claim 8, wherein the operations further comprise:

based upon determining a memory clarity value of the photographed person corresponding to the first face image is less than a specified threshold, deleting all face images that are of the photographed person corresponding to the first face image and that are in the second area in the database, and wherein the memory clarity value indicates a frequency at which the photographed person corresponding to the first face image appears in the second area.

10. The device according to claim 8, wherein the operation of comparing the first face image with face images in a second area in the database comprises:

comparing the first face image preferentially with a face image of the photographed person with a high memory clarity value in the second area in the database, and then comparing the first face image with a face image of theft photographed person with a low memory clarity value.

11. The device according to claim 8, wherein after the operation of obtaining the first face image in the image data, the operations further comprise:

obtaining a timestamp at which the first face image in the image data appears in the image data; and calculating, based on the timestamp of the first face image and a quantity of face images that are of the photographed person corresponding to the first face image and that are in the second area in the database, a memory clarity value of the photographed person corresponding to the first face image.

12. The device according to claim 8, wherein a memory clarity value comprises a long-term memory value or a short-term memory value, the long-term memory value is determined based on a quantity of face images that are of the photographed person corresponding to the first face image and that are in the second area in the database, and the short-term memory value is determined based on a timestamp of the recently stored first face image.

13. The device according to claim 8, wherein the operations further comprise:

based upon determining that the face images in the second area in the database do not comprise a face image of the photographed person corresponding to the first face image, comparing the face image with face images in a national identity card face image library.

14. The device according to claim 8, wherein the database further comprises identity information of the photographed person corresponding to the first face image, and the operations further comprise: displaying the identity information of the photographed person corresponding to the first face image on a display screen.

15. A non-transitory computer-readable storage medium, the computer-readable storage medium storing a computer program, and the computer program being configured such that, when executed on a computer, the computer is enabled to implement a method comprising:

receiving image data sent by a first camera, the image data comprising at least one face image, and the at least one face image comprising a first face image;

obtaining the first face image in the image data;

comparing the first face image with a face image in a first area in a database, the database being a database storing face images in each area, and the first area being an area in which at least one camera comprising the first camera is located;

based upon determining that the face image in the first area in the database does not comprise a face image of a photographed person corresponding to the first face image, comparing the first face image with face images in a second area in the database, the second area being an area obtained by expanding around the first area around, the second area being an area in which a plurality of cameras comprising the first camera are located, and a quantity of cameras in the second area being greater than a quantity of cameras in the first area; and based upon determining that the face images in the second area in the database comprise a face image of the photographed person corresponding to the first face image, clustering the first face image and the face image of the photographed person corresponding to the first face image.

16. The non-transitory computer-readable storage medium according to claim 15, wherein the method further comprises:

based upon determining that a memory clarity value of the photographed person corresponding to the first face image is less than a specified threshold, deleting all face images that are of the photographed person corresponding to the first face image and that are in the second area in the database, wherein the memory clarity value indicates a frequency at which the photographed person corresponding to the first face image appears in the second area.

17. The non-transitory computer-readable storage medium according to claim 15, wherein the comparing the first face image with face images in a second area in the database comprises:

comparing the first face image preferentially with a face image of the photographed person with a high memory clarity value in the second area in the database, and then comparing the first face image with a face image of the photographed person with a low memory clarity value.

18. The non-transitory computer-readable storage medium according to claim 15, wherein after the obtaining the first face image in the image data, the method further comprises:
    obtaining a timestamp at which the first face image in the image data appears in the image data; and
    calculating, based on the timestamp of the first face image and a quantity of face images that are of the photographed person corresponding to the first face image and that are in the second area in the database, the memory clarity value of the photographed person corresponding to the first face image.

19. The non-transitory computer-readable storage medium according to claim 15, wherein a memory clarity value comprises a long-term memory value or a short-term memory value, the long-term memory value is determined based on the quantity of face images that are of the photographed person corresponding to the first face image and that are in the second area in the database, and the short-term memory value is determined based on the timestamp of the recently stored first face image.

20. The non-transitory computer-readable storage medium according to claim 15, wherein the method further comprises:
    based upon determining that the face images in the second area in the database do not comprise a face image of the photographed person corresponding to the first face image, comparing the face image with face images in a national identity card face image library.

\* \* \* \* \*

UNITED STATES PATENT AND TRADEMARK OFFICE
CERTIFICATE OF CORRECTION

| | | |
|---|---|---|
| PATENT NO. | : 11,960,532 B2 | Page 1 of 1 |
| APPLICATION NO. | : 18/169017 | |
| DATED | : April 16, 2024 | |
| INVENTOR(S) | : Zhang et al. | |

It is certified that error appears in the above-identified patent and that said Letters Patent is hereby corrected as shown below:

In the Claims

Claim 3, Column 18, Line 26: "of theft photogrpahed person with a low memory" should read -- of the photographed person with a low memory --.

Claim 10, Column 19, Line 45: "of theft photogrpahed person with a low memory" should read -- of the photographed person with a low memory --.

Claim 15, Column 20, Line 34: "around, the second area being an area in which a" should read -- , the second area being an area in which a --.

Signed and Sealed this
Twenty-fourth Day of June, 2025

Coke Morgan Stewart
*Acting Director of the United States Patent and Trademark Office*